United States Patent [19]
Schleifstein

[11] Patent Number: 4,820,770
[45] Date of Patent: Apr. 11, 1989

[54] POLYAMIDE COMPOSITION
[75] Inventor: Robert A. Schleifstein, Baton Rouge, La.
[73] Assignee: Ethyl Corporation, Richmond, Va.
[21] Appl. No.: 148,025
[22] Filed: Jan. 25, 1988
[51] Int. Cl.$^4$ .................. C08F 8/18; C08L 71/04; C08L 77/06
[52] U.S. Cl. .................. 525/133; 525/151; 525/152; 525/391; 525/397
[58] Field of Search ........... 525/152, 391, 397, 151, 525/133

[56] References Cited
U.S. PATENT DOCUMENTS 4,067,930 1/1978 Versnel et al. ............. 524/466
4,127,559 11/1978 Newcombe ................ 524/411
4,141,880 2/1979 Nametz et al. ............. 525/397
4,430,467 2/1984 Lesniewski et al. ......... 524/411
4,559,392 12/1985 Grundmann ............... 525/391

Primary Examiner—J. Ziegler
Attorney, Agent, or Firm—Edgar E. Spielman, Jr.

[57] ABSTRACT

This invention relates to a thermoplastic formulation having a first part comprising, (i) nylon 6,6 nylon 6 or a mixture thereof and (ii) a halogenated polyphenylene ether flame retardant, and a second part, in admixture with the first part, comprising a Diels-Alder adduct having the formula $$A-R-(A)_n$$

wherein n is 0, 1 or 2 and A is a polyhalogenated cycloalkylene or cycloalkyl group and R is as defined herein.

15 Claims, No Drawings

POLYAMIDE COMPOSITION

BACKGROUND OF THE INVENTION

This invention relates to polyamide formulations which are flame retardant and have improved melt flow.

Two of the most commercially significant polyamides are poly(hexamethyleneadipamide), $\overline{M}_n$ 11,000 to 40,000, and polycaprolactam, $\overline{M}_n$ 11,000 to 40,000. These two polyamides are commonly referred to as, respectively, nylon 6,6 and nylon 6, and will be so referred to herein.

Formulations containing nylon 6,6 or nylon 6 and a substantial load of fillers do not exhibit high melt flows under processing conditions even though these nylons are highly crystalline. (Fillers can include, inerts, flame retardants, pigments, thermal stabilizers, etc.) It is disadvantageous for a formulation to have a low melt flow as the molten formulation does not flow well or quickly in a mold which can result in burning and incomplete article formation.

In today's market there is significant need for nylon 6,6 and nylon 6 based formulations which are flame retardant. Excellent flame retardancy can be obtained by including in the formulation, as a flame retardant, a halogenated polyphenylene ether of the type disclosed in U.S. Pat. No. 3,760,003. In addition, flame retardant synergists, such as $Sb_2O_3$ and $Fe_2O_3$, are often used in cooperation with such halogenated polyphenylene ethers. While the flame retardancy of such formulations is very high, e.g. a UL-94 rating of V-0, these formulations have a very low melt flow, e.g. a melt index of 2.5 g/10 min. ASTM 1238 k. With this low of a melt flow, processing of these formulations is difficult at best and productivity may suffer as a result.

The melt flow of such nylon 6,6 or nylon 6/halogenated polyphenylene ether formulations can be significantly improved by the use of a plasticizer, such as o- or p-toluenesulfonamide. Such plasticizers are not necessarily a panacea though, as many increase the flammability of the formulation and contribute to a lowering of the heat deflection temperature of articles made from the plasticizer containing formulation.

It is therefore an object of this invention to provide formulations which include nylon 6,6, nylon 6 or a mixture thereof, halogenated polyphenylene ether and, optionally, a flame retardant synergist, which formulations have both improved melt flow and high flame retardancy.

THE INVENTION

This invention relates to a thermoplastic formulation having two parts, the first part comprising nylon 6,6, nylon 6 or a mixture thereof, and a halogenated polyphenylene ether flame retardant. The second part is in intimate admixture with the first part and comprises a Diels-Alder adduct having the formula A—R—(A)$_n$ The A constituent is a polyhalogenated cycloalkylene group having the structure

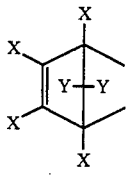

or the structure

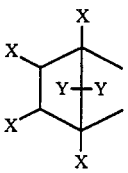

in which each X is independently a chloro, bromo or hydro group and each Y is independently a chloro, bromo, hydro, hydrocarbyl or hydrocarbyloxy group, and in which the total of said X's and Y's which are chloro or bromo groups is at least two.

The identity of R is dependent upon the value for n, which value may be 0, 1 or 2. When n is 0, R is either a divalent saturated cyclic polybromohydrocarbon group having 7 to 20 carbon atoms and 2 to 6 bromine atoms which are paired in vicinal positions, or a group having the structure,

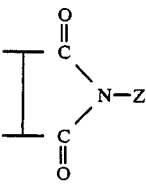

in which Z is a hydro, alkyl, aryl, alkaryl, aralkyl or cycloalkyl group, having up to 8 carbon atoms, or a halogenated derivative thereof.

When n is 1 or 2, R is defined as a tetra- or hexavalent saturated cyclic hydrocarbon group having 7 to 20 carbon atoms and 0 to 4 chlorine or bromine atoms which are paired in the vicinal positions, or a group having the structure,

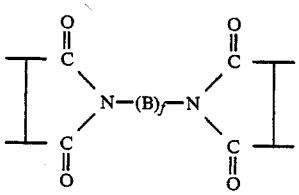

in which f=0 or 1 and B is a alkylene, arylene, alkarylene, aralkylene, cycloalkylene group, having up to 8 carbon atoms, or a halogenated derivative thereof.

The presence of the Diels-Alder adduct, above described, significantly enhances the melt index, as measured by ASTM 1238, method k, of the thermoplastic formulation of this invention. Compare, in the Example portion hereof, the melt index of a formulation comprised of a mixture of nylon 6,6, nylon 6, and a halogenated polyphenylene ether flame retardant, against those formulations which additionally contain the Diels-Alder adduct. The enhancement in the melt index is achieved without adversely affecting the flame retardancy and without a significant difference between the heat deflection temperature, as measured by ASTM D648, of a formulation comprised of the above-described first part, which is without the Diels-Alder adduct, and a formulation made in accordance with the present invention. This effect is achievable without the utilization of conventional plasticizers, which plasticizers can lower flame retardant qualities and adversely affect heat deflection temperature. This does not mean that plasticizers cannot be utilized in the thermoplastic formulations of this invention, as such plasticizers are permissible in those cases where their presence does not give the thermoplastic formulation such a low quality in regards to flame retardancy and to heat deflection temperature that articles produced therefrom are not acceptable for use. When a plasticizer is used in the thermoplastic formulation it is to be understood that the presence of the Diels-Alder adduct will lower the amount of plasticizer needed and, thus, in that regard reduce the extent to which the flame retardancy and the heat deflection temperature are lowered.

The manner in which the Diels-Alder adduct accomplishes the foregoing beneficial functions is not fully understood. It is theorized, though this invention is not to be restricted by such theory, that the operative constituent in the Diels-Alder adduct is the polyhalogenated cycloalkylene or cycloalkyl group. Under this theory, the identity of the R group is not particularly critical so long as it does not decrease flame retardancy or cause the Diels-Alder adduct to be unstable or too volatile under processing conditions.

The nylon constituent of the first part of the thermoplastic formulation can be a single nylon, i.e. nylon 6 or nylon 6,6 or can be a mixture of these two nylons. Generally speaking, a mixture of nylon 6,6 and nylon 6 is preferred and in a weight ratio of nylon 6 to nylon 6,6 within the range of from about 0.95 to about 0.05. A most useful weight ratio is within the range of from about 0.50 to about 0.10. Both nylon 6 and nylon 6,6 are commercially available from, for example, E. I. duPont deNemours & Co., Inc. and Allied Corporation. Processes for the preparation of and the properties of these two nylons are disclosed in Encyclopedia of Polymer Science and Technology, Volume 10, pages 553–569, Interscience Publishers, New York, New York.

The first part of the thermoplastic formulation of this invention also includes a halogenated polyphenylene ether flame retardant. Such a flame retardant can be represented by the structure,

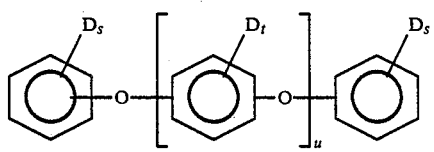

wherein each D is independently a chloro or bromo group, each s is independently an integer of 0 to 5, t is an integer of 0 to 4, u is an integer of 1 to 5 and 50 percent or more by weight of the compound is halogen. A most highly preferred halogenated polyphenylene ether is perbrominated diphenoxybenzene. A more detailed description of the halogenated polyphenylene ethers and a description of the process by which they can be prepared are recited in U.S. Pat. No. 3,760,003, which patent is incorporated herein by reference as if fully set forth. Ethyl Corporation sells such a flame retardant under the name Saytex ®120.

The Diels-Alder adduct constituent of the second part of the thermoplastic formulation of this invention has, as before recited, the formula

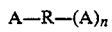

wherein n=0, 1 or 2. The A constituent of the adduct is provided by the diene while the R constituent is provided by the dieneophile which are reacted with one another in accordance with the Diels-Alder reaction. The Diels-Alder adducts of this invention are known and may be prepared by known methods which generally include reacting a polyhalocyclopentadiene with a suitable multi-unsaturated dieneophile to form a 1:1, when n=0, a 2:1, when n=1, and a 3:1, when n=2, Diels-Alder adduct. Bromine may then be added to remove any residual unsaturation if present.

When A is of the structure,

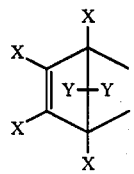

exemplary dienes that may be used in the Diels-Alder reaction are hexachlorocyclopentadiene, hexabromocyclopentadiene, 5,5,-dimethoxytetrachlorocyclopentadiene, 5,5-diethoxy-tetrachlorocyclopentadiene, 5,5-dihydro-tetrachlorocyclopentadiene, 5,5-dibromo-tetrachlorocyclopentadiene, 5-methyl-pentachlorocyclopentadiene, 5-methyl-5-hexyltetrabromocyclopentadiene, 5,5-didecyl-tetrachlorocyclopentadiene, 5-bromoethyl-pentabromocyclopentadiene, 5-decoxypentachlorocyclopentadiene, 1,2,3-tribromo-4,5,5-trichlorocyclopentadiene, 2,3,4-tribromo-cyclopentadiene, 1,2-dibromo-3,4,5-trichlorocyclopentadiene, etc.

Of the above described dienes, the most preferred diene is hexachlorocyclopentadiene.

When A is the structure,

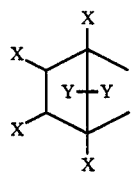

it is preferred to first obtain an intermediate adduct which has a

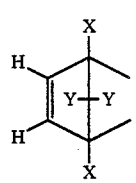

group as the A constituent. Then chlorine or bromine can be added across the double bond.

The identity of R is determined by the dieneophile used in the Diels-Alder reaction. When n=0, and R is a cyclic saturated polybromohydrocarbon group, the dieneophile can be a polybromocycloalkene, such as: 4,5-dibromocyclooctene; 4,5,8,9-tetrabromocyclododecene; 3-[2-(3,4-dibromocyclohexane)ethyl]-cyclohexene; 3,4,5-tribromocyclohexene; 3,4-dibromocyclohexene; etc. In some cases it may be desirable to use a dieneophile which is unhalogenated, i.e. a cycloalkadiene, e.g. cycloocta-1,4-diene, to form the mono adduct. The mono adduct, when first formed, will have unsaturation in the R group. This unsaturation is then brominated to yield the polybromohydrocarbon group. A preferred identity for R is 3,4-dibromocyclooctyl as it is a fairly uncomplex group with relatively easy synthesis.

The other identity of R, when n=0, is a group having the structure,

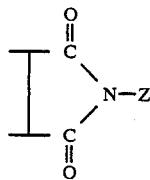

wherein Z is as previously defined. Such an imide group can be provided by the dieneophile, maleic anhydride, which yields an anhydride adduct which is then transformed to the imide adduct by reaction with an amine of the formula $NH_2-(G)$, wherein G is an alkyl, aryl, alkaryl, aralkyl or cycloalkyl group. This imide forming reaction occurs in the presence of a solvent and at a temperature of about 80° C. to about 200° C. The G group can contain up to 8 carbon atoms. Exemplary amines are methylamine, cyclohexylamine, ethylamine, aniline, etc. Preferred imide groups are N-methyl maleimide, N-ethyl maleimide, N-propyl maleimide, N-butyl maleimide, N-phenyl maleimide, N-benzyl maleimide and N-methylphenyl maleimide as they provide only a minimum amount of hydrogen in the adduct, which hydrogen contributes to the fuel value of the adduct. The resultant adduct can be referred to as an imide adduct.

When n is 1 or 2, a di- or tri-adduct is defined and the dieneophile precursor of the R group must provide sufficient polyunsaturation to produce the desired polyadduct. To obtain polyadducts, the following dieneophiles are exemplary when R is a tetra- or hexavalent saturated cyclic hydrocarbon group: 3,4-cycloocta-1,4-diene; cyclododeca-1,6-diene; cyclodeca-1,5-diene; trivinylcyclohexane; cyclododeca-1,5,9-triene, trimethylcyclododecatriene; cyclodeca-1,5,8-triene; etc. It is preferred that the number of unsaturated sites in the chosen dieneophile equal the value of n+1. To fill these unsaturated sites, the molar amount of dieneophile used in the Diels-Alder reaction should then be the product of n+1 and the number of moles of diene reactant used. However, it is possible to use less than this molar amount of dieneophile if the remaining unsaturated sites in the R group of the adduct are subsequently halogenated. A preferred R group, when n is 1, has the structure

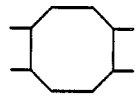

The other group which R can be when n=1 or 2 has the structure,

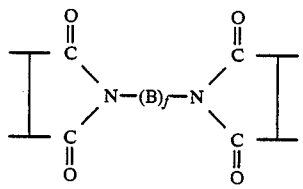

wherein B and f are as previously defined. With this structure for R, R can be referred to as a bis-imide group and the adducts can be referred to as bis-imide adducts. These bis-imide adducts are produced by reacting the A dienes with the same class of dieneophiles used in producing the before-described imide adducts. After the reaction, however, the resultant anhydride adduct is converted to the bis-imide adduct by reacting it with a diamine of the formula $H_2N-(E)_k-NH_2$ wherein E is an alkyl, aryl, alkaryl, aralkyl or cycloalkyl group and k is 0 or 1. The reaction occurs in the presence of a solvent and at a temperature of from about 80° C. to about 200° C. The E groups can contain up to 8 carbon atoms. Exemplary diamines are ethylene diamine, hydrazine, phenylenediamine, diaminocyclohexene, ethylphenylene amine, etc. A most preferred bis-imide group is N,N'-ethylene-bis-(maleimide).

Further details concerning the Diels-Alder adducts of this invention and the processes for their manufacture are recited in U.S. Pat. Nos. 3,761,443; 3,899,463; 3,903,109; 3,917,642; 3,922,316; 3,923,734; 3,950,456; 4,067,930; 4,127,559 and 4,430,467 which are incorporated herein as if fully set forth.

The most preferred Diels-Alder adducts of this invention are: N,N,-dialkyl-bis-(dibromonorbornane-dicarboximide)s and in particular, N,N'-1,2-ethane-bis-(5,6-dibromonorbornane-2,3-dicarboximide) which is sold by Ethyl Corporation as BN-451; 5,6-dibromo-1,10,11,12,13,13-hexachlorotricyclo[8.2.1.0$^{2,9}$]-trideca-11-ene; and 1,6,7,8,9,14,15,16,17,17,18,18-dodecachloro-pentacyclo[12.2.1.1.$^{6,9}$.0$^{2,13}$.0$^{5,10}$]octadeca-7,15-diene which is a 2:1 Diels-Alder adduct of hexachlorocyclopentadiene and octadiene sold by Occidental Petroleum, Inc. as Dechlorane ®Plus.

The nylon and the halogenated polyphenylene oxide flame retardant, of the first part, are conventionally intimately mixed with the Diels-Alder adducts of this invention, of the second part, by the use of known methods and equipment. For example, a twin screw extruder may be conventionally used.

Although the flame retardant of this invention is efficient, it is frequently desirable to enhance its effectiveness by including one or more synergists, such as the synergists conventionally used with halogenated flame retardants. These synergists include, e.g., oxides, sulfides, or organic acid salts, of antimony and oxides of iron, e.g. $Fe_2O_3$. The preferred synergist for use in the formulations of the invention is a combination of antimony trioxide and $Fe_2O_3$. When a synergist is employed, it is usually used in an amount such as to provide a flame retardant/synergist weight ratio of about 1-4.5/1, preferably about 2/1.

Other conventional ingredients may be present in the formulations of this invention, such ingredients including, pigments, lubricants, thermal stabilizers, UV stabilizers, antioxidants, etc. These ingredients are used in conventional amounts.

The formulations of this invention will generally contain from about 70 to about 90 wt. % nylon; from about 10 to about 25 wt. % halogenated polyphenylene oxide flame retardant; and from about 1.5 to about 5 wt. % Diels-Alder adduct. A preferred formulation contains from about 70 to about 80 wt. % nylon; from about 14 to about 21 wt. % halogenated polyphenylene oxide flame retardant; and from about 1.5 to about 3 wt. % Diels-Alder adduct. All of the foregoing wt. % figures are based upon the total weight of the formulation. In its smallest concentration, the amount of Diels-Alder adduct present will be that amount needed to enhance the melt index, ASTM 1238 k, of a composition containing nylon 6,6, nylon 6 or mixtures thereof and a halogenated polyphenylene oxide flame retardant.

The following examples are given to illustrate the invention and are not intended as a limitation thereof. Unless otherwise specified, quantities mentioned are quantities by weight.

In the following Examples the formulations indicated were used to form molded bars which were used in the tests listed. The formulations were prepared by means of a twin screw mixer operated in a conventional manner. The bars formed from the formulations were obtained by injection molding. For Example I, the injection molding temperature was about 520° F. Examples II–VII were molded at a temperature within the range of 470° F. to 500° F.

Flame retardancy was measured in accordance with UL-94, Vertical Burning Test for Classifying Materials V-0, V-1 or V-2.

The Melt Index test was run in accordance with ASTM 1238 k.

The H.D.T. (heat deflection test) was run in accordance with ASTM D648.

Examples I–III are not of this invention. Example I concerns a formulation which can be defined as the above referred to first part of the formulation of this invention, the first part being that which contains nylon and halogenated polyphenylene oxide. Examples II and III do not contain the Diels-Alder adducts of this invention but do contain p-toluenesulfonamide, a well-known plasticizer.

| Example No. | Formulation | | UL-94 @ 1/32" | Melt Index g/10 Min. | H.D.T. °C. ⅛" |
|---|---|---|---|---|---|
| I | Saytex ® 120 flame retardant | 21.0% | V-O | 2.5 | 70° |
| | Sb₂O₃ | 4.2% | | | |
| | Fe₂O₃ | 4.2% | | | |
| | Nylon 6,6 | 63.6% | | | |
| | Nylon 6 | 7.0% | | | |
| II | Saytex ® 120 flame retardant | 21.0% | V-O | 6.7 | 60° |
| | Sb₂O₃ | 4.2% | | | |
| | Fe₂O₃ | 4.2% | | | |
| | P-Toluenesulfonamide | 3.0% | | | |
| | Nylon 6,6 | 60.9% | | | |
| | Nylon 6 | 6.7% | | | |
| III | Saytex ® 120 flame retardant | 17.0% | V-O | 6.5 | 67° |
| | Sb₂O₃ | 4.2% | | | |
| | Fe₂O₃ | 4.2% | | | |
| | P-Toluenesulfonamide | 2.0% | | | |
| | Nylon 6,6 | 65.4% | | | |
| | Nylon 6 | 7.2% | | | |
| IV | Saytex ® 120 flame retardant | 19.0% | V-O | 12.5 | 72° |
| | Sb₂O₃ | 4.2% | | | |
| | Fe₂O₃ | 4.2% | | | |
| | Dechlorane ® Plus flame retardant | 2.0% | | | |
| | Nylon 6,6 | 63.6% | | | |
| | Nylon 6 | 7.0% | | | |
| V | Saytex ® 120 flame retardant | 17.0% | V-O | 9.9 | 71° |
| | Sb₂O₃ | 4.2% | | | |
| | Fe₂O₃ | 4.2% | | | |
| | Dechlorane ® Plus flame retardant | 2.0% | | | |
| | Nylon 6,6 | 65.4% | | | |
| | Nylon 6 | 7.2% | | | |
| VI | Saytex ® 120 flame retardant | 19.0% | V-O | 6.8 | 72° |
| | Sb₂O₃ | 4.2% | | | |
| | Fe₂O₃ | 4.2% | | | |
| | Saytex ® BN-451 flame retardant | 2.0% | | | |
| | Nylon 6,6 | 63.6% | | | |
| | Nylon 6 | 7.0% | | | |
| VII | Saytex ® 120 flame retardant | 17.0% | V-O | 9.7 | 70° |
| | Sb₂O₃ | 4.2% | | | |
| | Fe₂O₃ | 4.2% | | | |
| | Saytex ® BN-451 flame retardant | 2.0% | | | |
| | Nylon 6,6 | 65.4% | | | |
| | Nylon 6 | 7.2% | | | |
| VIII | Saytex ® 120 flame retardant | 18.0% | V-O | 22.5 | — |
| | Sb₂O₃ | 4.2% | | | |
| | Fe₂O₃ | 4.2% | | | |
| | Nylon 6,6 | 63.4% | | | |
| | Nylon 6 | 7.0% | | | |
| | Saytex ® BC-26 flame retardant | 3.0% | | | |
| | Sodium Stearate | .2% | | | |

Saytex ® 120 flame retardant is a perbrominated diphenoxybenzene product.
Dechlorane ® Plus flame retardant is a 2:1 Diels-Alder adduct product of hexachlorocyclopentadiene and octadiene.
Saytex ® BN-451 flame retardant is a N,N'—1,2-ethane-bis-(5,6-dibromonorbornane)-2,3-dicarboximide product.
Saytex ® BC-26 flame retardant is a 5,6-dibromo-1,10,11,12,13,13-hexachlorotricyclo-[8.2.1.0²·⁹]-tridec-11-ene product.

As can be seen from the above Examples, the absence of a Diels-Alder adduct of this invention in Examples I–III gives a formulation with a low melt index. Those Examples of this invention, i.e. Examples IV–VIII, show an enhanced melt flow index over that for Example I, while at the same time maintaining a high heat deflection temperature. While the melt index in Examples II and III is improved over that shown for Example I, the sacrifice in heat deflection temperature is significant.

What is claimed:
1. A thermoplastic formulation having:
  (a) a first part comprising,
    (i) nylon 6,6, nylon 6 or a mixture thereof, and
    (ii) a halogenated polyphenylene ether flame retardant; and

(b) a second part, in admixture with said first part, said second part comprising, a Diels-Alder adduct having the formula,

wherein n=0, 1, or 2,

A is a polyhalogenated cycloalkylene group having the structure,

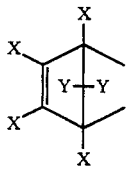

or the structure

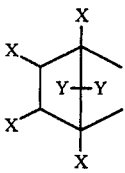

in which each X is independently a chloro, bromo or hydro group and each Y is independently a chloro, bromo, hydro, hydrocarbyl or hydrocarbyloxy group, and the total of said X's and Y's which are chloro or bromo groups, is at least two, R, when n=0, is a divalent saturated cyclic polybromohydrocarbon group having 7 to 20 carbon atoms and 2 to 6 bromine atoms which are paired in vicinal positions, or a group having the structure,

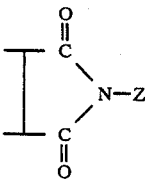

which Z has up to 8 carbon atoms and is an alkyl, aryl, alkaryl, aralkyl cycloalkyl group, or a halogenated derivative thereof, and R, when n=1 or 2, is, respectively, tetra- or hexavalent saturated cyclic hydrocarbon group having 7 to 20 carbon atoms and 0 to 4 chloro or bromo atoms which are paired in vicinal positions, or a group having the structure,

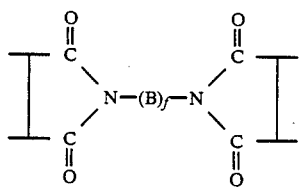

in which f=0 or 1 and B has up to 8 carbon atoms and is an alkylene, arylene, alkarylene, aralkylene, cycloalkene group or a halogenated derivative thereof, said Diels-Alder adduct being present in an amount sufficient to provide said formulation with a melt index, as measured by ASTM 1238 k, which ia greater than that obtainable with said first part alone.

2. The thermoplastic formulation of claim 1 wherein said formulation contains from about 70 to about 90 wt% nylon 6,6, nylon 6 or mixtures thereof, from about 10 to about 25 wt% halogenated polyphenylene oxide flame retardant, and from about 1.5 to about 5 wt % Diels-Alder adduct.

3. The thermoplastic formulation of claim 1 wherein said halogenated polyphenylene ether flame retardant is perbrominated diphenoxybenzene.

4. The thermoplastic formulation of claim 1 wherein said Diels-Alder adduct is formed from the Diels-Alder reaction of the diene, hexachlorocyclopentadiene, and a dieneophile percursor for R.

5. The thermoplastic formulation of claim 1 wherein n=0 and said Diels-Alder adduct is formed from the Diels-Alder reaction of a diene precursor for A, and the dieneophile, 4,5-dibromocyclooctene.

6. The thermoplastic formulation of claim 1 wherein n=0 and said Diels-Alder adduct is formed from the Diels-Alder reaction of from a diene precursor for A, and the dieneophile, cycloocta-1,4-diene followed by bromination of the double bond in the R constituent.

7. The thermoplastic formulation of claim 1 wherein n=1 and said Diels-Alder adduct is formed from the Diels-Alder reaction of a diene precursor for A, and the dieneophile, cycloocta-1,4-diene and wherein the molar ratio of the diene precursor for A to the dieneophile is 2 to 1.

8. The thermoplastic formulation of claim 1 wherein n—1 and said Diels-Alder adduct is formed from the Diels-Alder reaction of a diene precursor for A, and the dieneophile, maleic anhydride, followed by the conversion of the resultant Diels-Alder anhydride by the reaction with ethylenediamine.

9. The thermoplastic formulation of claim 1 wherein said Diels-Alder adduct is N,N'-1,2-ethane-bis-(5,6-dibromonorbornane-2,3-dicarboximide).

10. The thermoplastic formulation of claim 1 wherein said Diels-Alder adduct is 5,6-dibromo-1,10,11,12,13,13-hexachlorotricyclo[8.2.1.0$^{2,9}$]-tridec-11-ene.

11. The thermoplastic formulation of claim 1 wherein said Diels-Alder adduct is 1,6,7,8,9,14,15,16,17,17,18,18-dodecachloro-penta-cyclo[12.2.1.1.$^{6,9}$,0$^{2,13}$,0$^{5,10}$]octadeca-7,15-diene.

12. An injection molded article formed from the thermoplastic formulation of claim 1.

13. An injection molded article formed from the thermoplastic formulation of claim 9.

14. An injection molded article formed from the thermoplastic formulation of claim 10.

15. An injection molded article formed from the thermoplastic formulation of claim 11.

* * * * *

UNITED STATES PATENT AND TRADEMARK OFFICE
CERTIFICATE OF CORRECTION

PATENT NO. : 4,820,770

DATED : APRIL 11, 1989

INVENTOR(S) : ROBERT A. SCHLEIFSTEIN

It is certified that error appears in the above-identified patent and that said Letters Patent is hereby corrected as shown below:

Cover page, Abstract, reads "nylon 6,6 nylon 6", and should read -- nylon 6,6, nylon 6 --.

Column 10, line 16, reads "which ia greater", and should read -- which is greater --.

Column 10, line 46, reads "wherein n - 1", and should read -- wherein n = 1 --.

Signed and Sealed this

Second Day of October, 1990

Attest:

HARRY F. MANBECK, JR.

*Attesting Officer*     *Commissioner of Patents and Trademarks*